Figure 1:
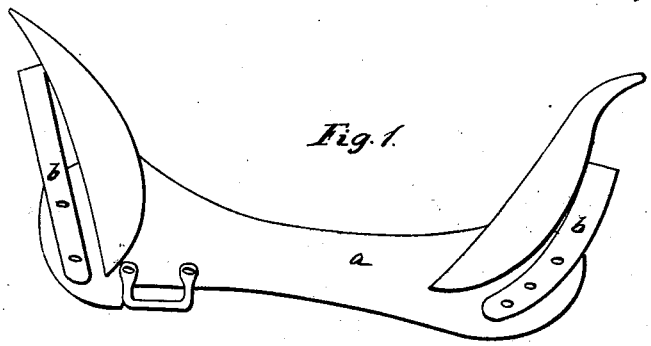

D. Campbell,
Riding Saddle,

Nº 13,213. Patented July 10, 1855.

UNITED STATES PATENT OFFICE.

DANL. CAMPBELL, OF WASHINGTON, DISTRICT OF COLUMBIA.

SADDLETREE.

Specification of Letters Patent No. 13,213, dated July 10, 1855.

*To all whom it may concern:*

Be it known that I, DANIEL CAMPBELL, of the city and county of Washington, in the District of Columbia, have invented a new and Improved Dragoon-Saddletree; and I do hereby declare that the following is a full and exact description thereof, reference being had to the accompanying drawings, making a part of this specification.

The improvement in my dragoon saddle-tree consists in uniting the pommel and cantle to the side bars by means of stiff springs, in connection with the giving of such a shape to the lower ends of the legs of the pommel and cantle, or to the outer sides of the side bars, that the act of girthing a saddle to a horse will cause the side bars to adapt themselves to the back of the animal whether he may be fat or lean. The side bars $a$, $a$, should be of such a shape as will best adapt themselves to the usual form of a horse's back and withers. The pommel and cantle may be given such a shape as will best adapt the tree for the construction of a saddle thereupon. The springs $b$, $b$, are secured to the pommel and cantle, substantially as represented in the drawings. The said springs should be so stiff as to throw the side bars outward against the lower extremities of the legs of the pommel and cantle when not acted upon by any inward pressure.

It will be perceived that the springs $b$, $b$, are of such a length that they allow the side bars $a$, $a$, to be moved inward or outward, and also permit the said bars to assume the very best position to adapt themselves to horses of various sizes and conditions of flesh. This, it will readily be perceived, would not be the case if the side bars were united to the pommel and cantle by means of joints. Another advantage of connecting the side bars $a$, $a$, to the pommel and cantle by means of long legged springs, is that the side bars are allowed to move lengthwise to a limited extent, which enables them to self adjust themselves to any fault of shape either in the horse or the side bars, and thereby cause a more perfect adaptation of one to the other than has ever before been accomplished.

Figure 2:
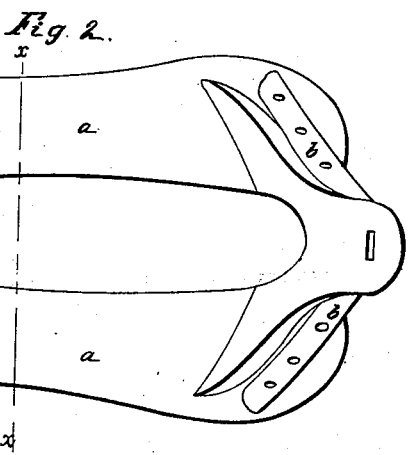
Figure 3:
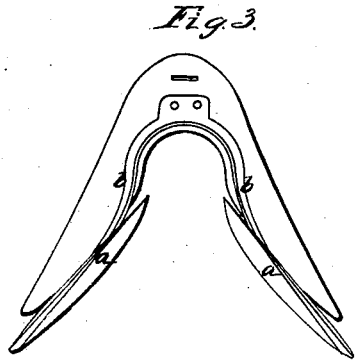
Figure 4:
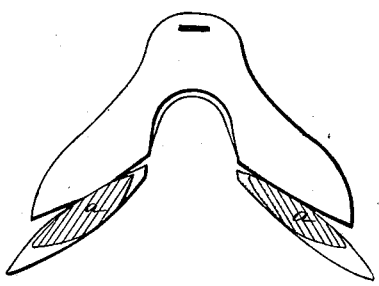

In the accompanying drawings Figure 1 is a side view; Fig. 2, a top view, and Fig. 3, a front end view of my improved saddletree; and Fig. 4, is a transverse section in the line $x$, $x$, of Fig. 2.

I have characterized my invention in the foregoing specification, as an improved dragoon saddle tree, but my improvement may be advantageously combined with other saddle trees, and therefore I wish it to be understood that I do not confine myself to the improvement of the dragoon saddle tree alone.

I do not claim uniting the side bars of a saddle tree to the pommel and cantle by means of joints, but What I do claim is—

The combination of the side bars $a$, $a$, to the pommel and cantle by means of the springs $b$, $b$, substantially in the manner and for the purpose herein set forth.

DANL. CAMPBELL.

Witnesses:
 Z. C. ROBBINS,
 G. W. ADAMS.